United States Patent [19]

Lang

[11] 4,344,671
[45] Aug. 17, 1982

[54] MULTIPLE PULSE LASER ASSEMBLIES
[75] Inventor: Paul W. Lang, Orange, Calif.
[73] Assignee: Raymus K. Payton, Newport Beach, Calif.
[21] Appl. No.: 104,186
[22] Filed: Dec. 17, 1979
[51] Int. Cl.³ .................................................. G02B 27/14
[52] U.S. Cl. ..................................... 350/174; 372/700
[58] Field of Search ............... 350/174, 171, 170, 286; 370/1, 3

[56] References Cited
U.S. PATENT DOCUMENTS

| | | | |
|---|---|---|---|
| 3,334,538 | 8/1967 | Steinhausen | 350/286 |
| 3,743,383 | 7/1973 | Giallorenzi | 350/174 |
| 4,093,354 | 6/1978 | Leeb | 350/174 |
| 4,154,507 | 5/1979 | Barr | 350/174 |
| 4,264,135 | 4/1981 | Lang | 350/174 |

OTHER PUBLICATIONS

Bramley, A., "High-Power Light...", *App. Phys. Ltrs.*, vol. 5, No. 10, pp. 210-212, Nov. 1964.

*Primary Examiner*—Jon W. Henry
*Attorney, Agent, or Firm*—Charles H. Thomas

[57] ABSTRACT

The assembly includes a plurality of individual pulse lasers arranged to be successively triggered at predetermined time intervals. A single light transmissive body receives the output pulses from the lasers at different input angles so that the respective pulses follow different path lengths in the body. The sequence of firing of the lasers and the respective angles are such that pulses exiting from the body will all exit substantially simultaneously. The result is a high energy concentration of output light.

2 Claims, 6 Drawing Figures

MULTIPLE PULSE LASER ASSEMBLIES

This invention relates generally to optics and more particularly to an assembly of pulse lasers together with a light transmissive body serving to combine the individual output pulses from the lasers to provide a single high energy concentrated pulse of light.

BACKGROUND OF THE INVENTION

In my copending patent application Ser. No. 97,516 filed Nov. 26, 1979, now U.S. Pat. No. 4,264,135, issued Apr. 28, 1981 and entitled METHOD AND APPARATUS FOR CONVERTING STEADY LIGHT INTO OUTPUT LIGHT COMPRISED OF PERIODIC HIGH AMPLITUDE PULSES, there is described a system wherein a light beam of steady light is passed into a solid body of light transmissive material while moving through a given acute angle. The arrangement is such that the initially received light in the body when the beam starts its movement through the acute angle follows a first path of a first given length before it emerges from the body. Subsequently received light in the body as the beam moves through its angle continuously intercepts the initially received light and as a consequence, the light is bunched or integrated throughout its travel so that it emerges from the exit end of the body at the time the beam reaches the end of its angular sweep all in a giant high amplitude pulse.

While light integrating systems have been known heretofore wherein separate media are utilized to effect individual delays to light which is broken up into component parts and then effect a recombination thereof at a single point in time, there has not, to the best of my knowledge, ever been proposed a conversion system for steady light into high amplitude pulses such as set forth in my above-described pending patent application.

BRIEF DESCRIPTION OF THE PRESENT INVENTION

With the foregoing in mind, the present invention constitutes a "light bunching system" for providing a high output burst of light energy utilizing some of the principles referred to and taught in my heretofore identified pending patent application. However, rather than sweep a steady laser light beam or other light source beam through a given angle, the present invention substitutes a plurality of pulse type lasers oriented to direct their output pulses into a light transmissive body at different angles. Appropriate trigger and delay means are provided for successively firing the lasers to result in successive pulses travelling different path lengths in the light transmissive body. Because the paths differ in length, and because the first fired laser follows the longest path, the respective pulses can be caused to exit from the body substantially simultaneously.

BRIEF DESCRIPTION OF THE DRAWINGS

A better understanding of this invention will be had by now referring to various embodiments thereof as illustrated in the accompanying drawings in which.

DETAILED DESCRIPTION OF THE INVENTION

Figure 1:
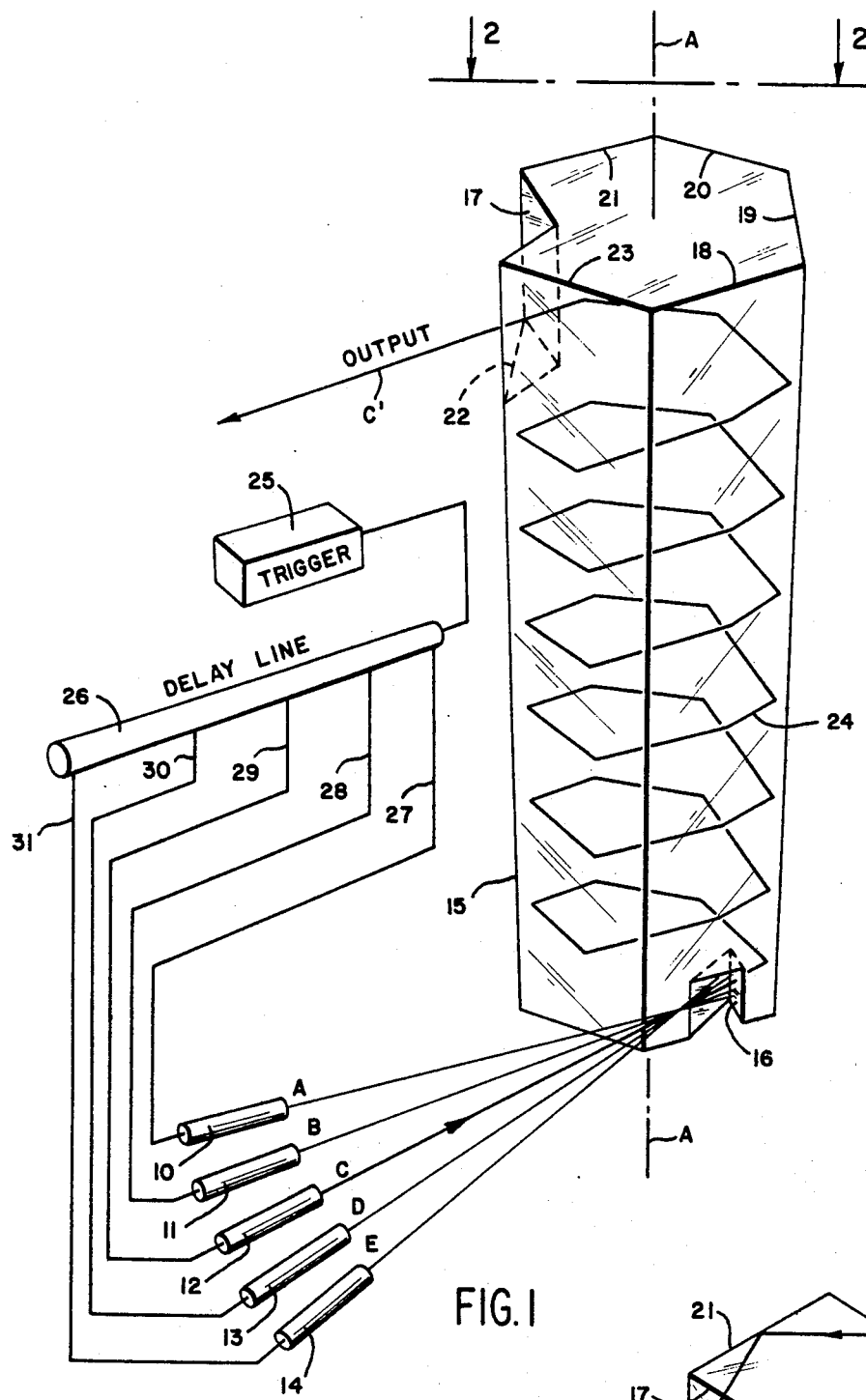
FIG. 1 is a highly schematic perspective view of the multiple pulse laser assembly constituting the preferred embodiment of the present invention.

Referring first to FIG. 1, there is shown a plurality of pulse lasers 10, 11, 12, 13 and 14, each capable of generating a giant pulse of coherent light in response to a trigger signal received thereby. In FIG. 1, the respective light pulses are indicated by the letters A, B, C, D, and E. An example of a giant pulse laser is a solid state laser wherein the Q of the optical cavity is maintained in a "spoiled" condition until an abnormally large inverted population level is established by pumping of the laser. By then restoring the optical cavity Q with a trigger signal, a single giant output laser pulse is generated.

Cooperating with the plurality of lasers as shown in FIG. 1 is an elongated body 15 of light transmissive material. Body 15 is provided with a light entrance means in the form of a triangular cut-out 16 at one end of the elongated body 15 and a light exit means again in the form of a triangular cut-out 17 adjacent the opposite end of the body 15.

In the particular embodiment disclosed in FIG. 1, the body 15 takes the form of a glass having a plurality of polished side surfaces 18, 19, 20, 21 and 22 defining a hexagon in cross section; that is, in a section taken normal to the elongated axis designated A—A for the body.

With the foregoing arrangement, light pulses from the various lasers are directed into the light entrance means 16 at angles different from each other so that the light paths between the light entrance means 16 and light exit means 17 travelled by the output pulses from the respective lasers are of different lengths.

In FIG. 1, there is shown one such helical light path designated 24 for the laser 12, the input pulse being indicated by the letter C and the output pulse at the end of the helical path 24 being indicated at C'. The angle of the output pulse from the laser 12 determines the pitch of the helical path 24. Similar helical paths will be followed by the giant pulses generated by the other lasers and will have different pitches depending upon the entry angle.

Referring now to the upper left portion of FIG. 1, there is shown a trigger generating means 25 cooperating with a delay line 26. Delay line 26 is connected to the trigger means 25 and is provided with various tap off points 27, 28, 29, 30 and 31 connecting respectively to the successive lasers 10 through 14.

With the foregoing arrangement, the respective lasers 10 through 14 will be successively triggered at predetermined time intervals. The angle of entry of the output pulses from the lasers and these predetermined time intervals are so calculated that the output pulses from the lasers exit from the light exit means 17 in the body substantially simultaneously.

With respect to the foregoing, the operation of the embodiment of FIG. 1 is similar to that in my heretofore referred to pending patent application. Rather than sweep a continuous laser beam through a given acute angle, however, in the present invention, there are provided discrete lasers already oriented to emit laser pulses entering the light transmissive body at discrete angles covering a range similar to the range of angles within the acute angle utilized in my prior case.

Thus, the time interval between successive firings of the laser shown in FIG. 1 are essentially defined by the length of time it takes light to travel a path length corresponding to the difference in successive path lengths for the lasers in question. As a consequence, the various successive pulses received at the light entrance means 16 will all exit substantially simultaneously as noted heretofore to provide for a large concentration of light energy.

Figure 2:
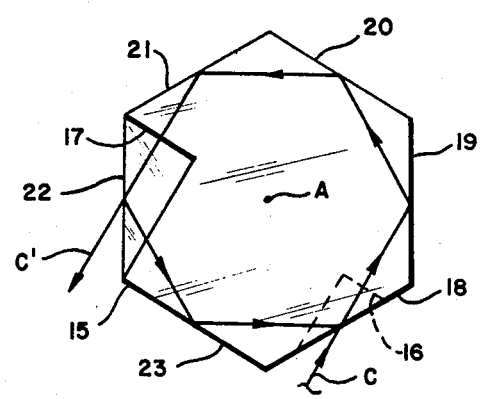
FIG. 2 is a top plan view of one of the components of the system looking in the direction of the arrows 2—2 of FIG. 1.

FIG. 2 shows more clearly the manner in which internal reflections are effected at the various polished surfaces 18 through 23. While six surfaces have been shown defining the hexagon in cross section, more surfaces could be provided if desired or even a lesser number such as four surfaces as shown and described in my prior pending patent application. However, it is necessary to have a sufficient number of surfaces that the critical angle for total internal reflection is not exceeded as otherwise the light will escape from one of the side surfaces of the body.

By defining the various light paths totally within a solid light transmissive body by means of internal reflections, losses are minimized.

Figure 3:
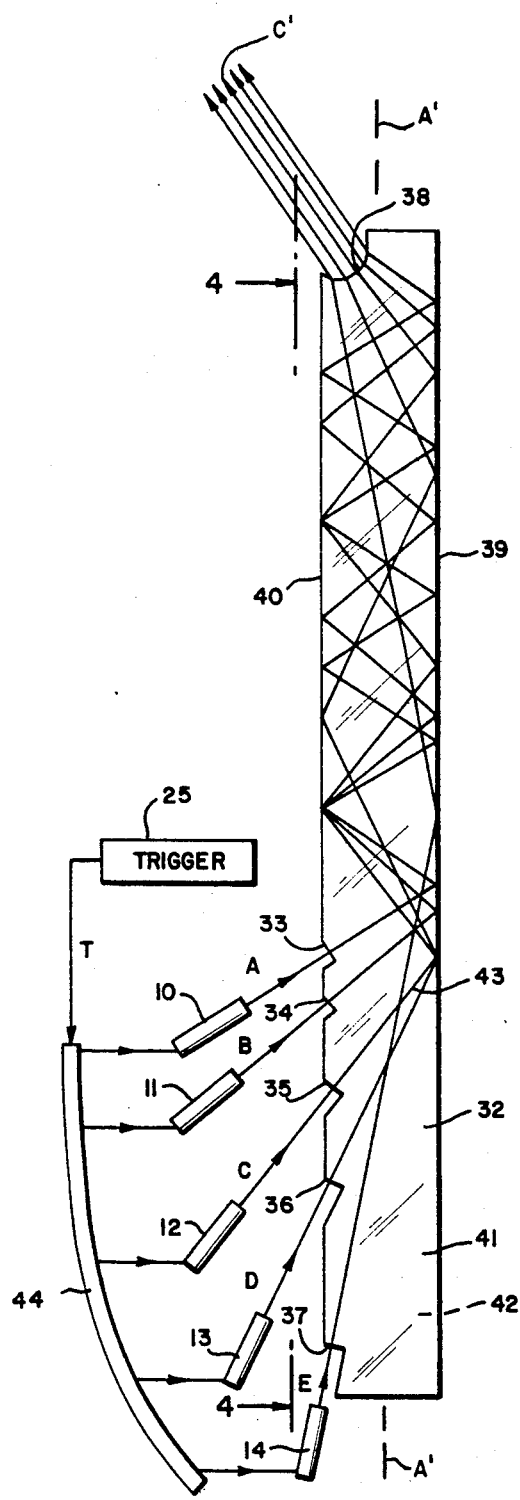
FIG. 3 is a schematic view of a second embodiment of the invention.

Referring now to FIG. 3, there is shown a second embodiment of the invention wherein a plurality of lasers which may be identical to the lasers 10 through 14 are again provided and designated by the same numerals in FIG. 3. In this embodiment, the elongated light transmissive body is designated 32 and includes a light entrance means comprised of of a plurality of separate triangular shaped cut-outs such as indicated at 33, 34, 35, 36 and 37 at successively spaced distances from one end of the body. The lasers 10 through 14, in turn, are oriented to direct their output pulses into these respective triangular cut-outs all again at different angles. The arrangement is such that among the various light paths followed by the output pulses, no two paths follow a like direction in the body.

The light exit means for the body 32 in the embodiment of FIG. 3 takes the form of a single continuous curved cut-out 38 positioned to intercept the ends of the various paths in such a manner to direct exiting light in parallel directions.

The body 32 has two opposite parallel side surfaces 39 and 40 between which internal reflections of the various laser light pulses take place. In the example illustrated, two other side surfaces 41 and 42 complete the perimeter of the body 32.

For purposes of illustration, there is again designated an output light pulse by the letter C from the laser 12 entering the light entrance cut-out 35 and following a path 43 within the body 32. This path is shaped essentially similar to a sawtooth with multiple internal reflections taking place at an angle determined by the entrance angle to the elongated axis of the body.

It will be immediately evident that similar sawtooth shaped paths but at different internal reflective angles are defined for the outputs from the other lasers so that the total path lengths that the respective pulses follow differ from each other, each crossing the longitudinal axis A'—A' at different angles.

The trigger means 25 of FIG. 1 may be utilized for the system in FIG. 3. However, there is provided a different delay line means 44 with appropriate tap off points to define different time intervals appropriately calculated such that the output pulses exiting from the curved lens surface 38 will all exit substantially simultaneously.

Figure 4:
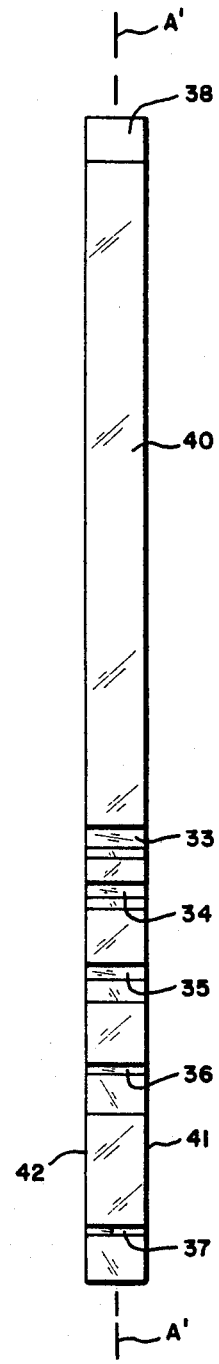
FIG. 4 is a front view of one of the components looking in the direction of the arrows 4—4 of FIG. 3.

In the front view of FIG. 4, the opposite remaining sides 41 and 42 are seen to be in a spaced parallel relationship somewhat narrower than the parallel sides 39 and 40 described in FIG. 3.

Figure 5:
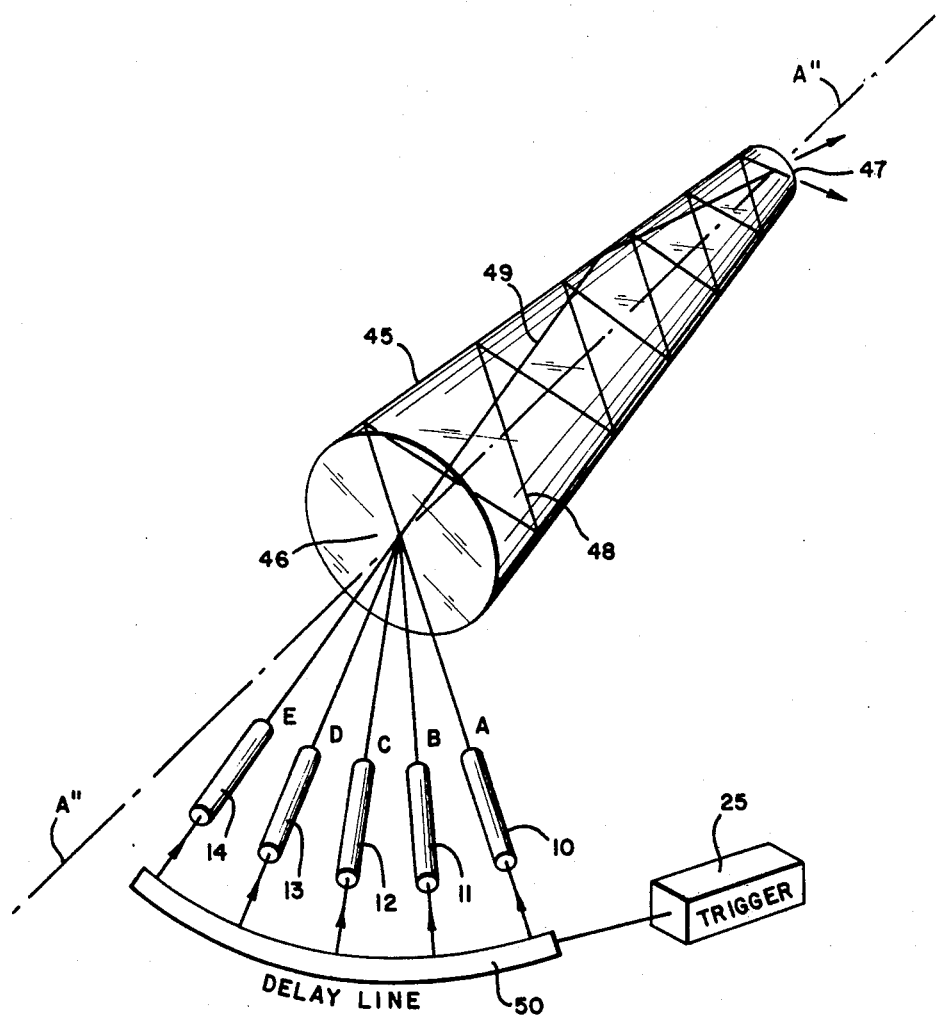
FIG. 5 is a diagramatic perspective view of yet a third embodiment of the invention; and, FIG. 6 comprises a series of time graphs useful in explaining the operation of the invention.

Referring now to FIG. 5, there is shown a third embodiment of the invention wherein the elongated body of light transmissive material takes the form of a fiber optic cylinder 45. The light entrance and light exit means are defined by flat end surfaces 46 and 47 respectively normal to the longitudinal axis designated A'-'—A".

The same plurality of lasers 10 through 14 described in the previous embodiments may be used in the system of FIG. 5 and also the same trigger generating means 25. However, again a different delay line 50 is provided to define appropriate time intervals between successive firings of the lasers to result in the successively received input light pulses all exiting from the far end of the fiber optic cylinder 45 at substantially the same time.

In FIG. 5, there is given the light path for the laser 10 at 48 which is the longest path and again simulates a sawtooth. The shortest path length, in turn, is for the laser 14 and is indicated at 49 wherein there is only a single internal reflection.

The various light paths for the lasers in between will successively decrease between the limits of the light path for the laser 10 and the light path for the laser 14.

As in the case of the other embodiments, a given time interval is introduced during the firing of the successive lasers, the same again being accomplished by a delay line indicated at 50. For example, the length of time it would take light to travel a path equal to the difference between the path lengths 48 and 49 would correspond to the time interval between the firing of the laser 10 and the firing of the laser 14. As a result, and as described heretofore, all of the pulses will exit from the fiber optic cylinder at the exit means 47 at one point in time.

Figure 6:
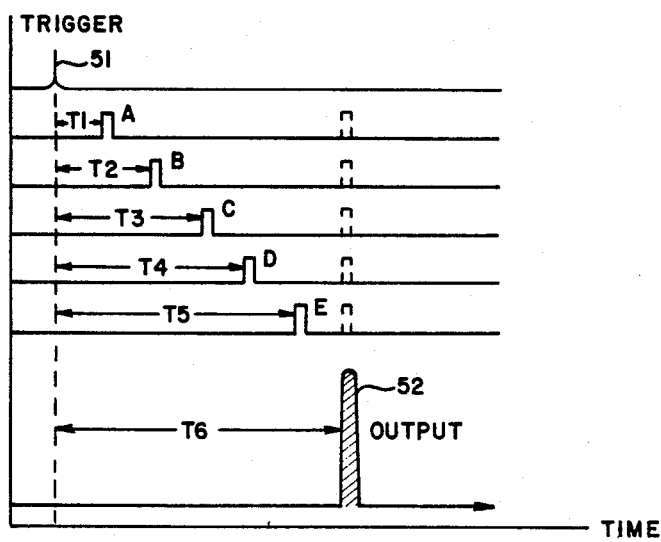

FIG. 6 is a time diagram illustrating the foregoing not only for FIG. 5 but for the other embodiments as well. Thus, if the capital letters A, B, C, D, and E represent the respective pulses from the lasers 10 through 14, it will be noted that the laser 10 is first triggered from a basic generated trigger signal 51 after a time T1. The next laser is triggered after a time T2, the next after a time T3, the next after a time T4 and the last laser after a time T5. After a total lapse of time T6, the output pulse will appear at the end of the particular light emissive body whether it be that shown in FIG. 1, FIG. 3 or FIG. 5.

Since the light pulse A travels the longest path in each instance, it will not arrive at the position of the output pulse 52 in FIG. 6 until a total time interval T6 has passed. A dotted line showing of the pulse A is represented in FIG. 6 in alignment with the output pulse 52.

The path length for the laser pulse B is less than that for A, but since it was generated at a later period in time because of the delay line, it will again arrive in coincidence with the output pulse 52 as also indicated by the dotted line pulse. Similar dotted line positions are shown for the laser pulses C, D and E.

All the dotted line pulses shown will add up to the giant output pulse 52 described in FIG. 6.

From all of the foregoing, it will be seen that the present invention has provided a unique multiple pulse laser assembly wherein output pulses from individual lasers can be bunched together to occur and be utilized at a single point in time by a single light transmissive body or medium.

I claim:

1. A multiple pulse laser assembly including, in combination:
    (a) a plurality of pulse lasers, each generating a giant pulse of coherent light in response to a trigger signal received thereby;
    (b) an elongated body of light transmissive material having light entrance means and light exit means, in which said elongated body has a pair of opposite parallel polished side surfaces, said light entrance means comprising a plurality of separate triangular-shaped cut-outs in one of said side surfaces at successively spaced distances from one end of the body, said plurality of lasers being positioned to direct their output pulses into said separate triangular-shaped cut-outs respectively to effect internal reflections from said opposite side surfaces following generally sawtoothed-shaped paths, the spacing of said cut-outs and the angles of entry of said output laser pulses being such that no two paths follow a like direction in said body, said light exit means comprising a single continuous curved cut-out defining a lens intercepting the ends of said paths and directing exiting light along in parallel directions;
    (c) a trigger means for providing a trigger signal for said lasers; and,
    (d) delay line means connected to said trigger means and having tap off points to said pulse lasers so that said trigger signal travels down said delay line means to trigger successively said pulse lasers at predetermined time intervals such that the output pulses from said lasers exit from said light exit means in said body substantially simultaneously.

2. A multiple pulse laser assembly including, in combination:
    (a) a plurality of pulse lasers, each generating a giant pulse of coherent light in response to a trigger signal received thereby;
    (b) an elongated body of light transmissive material having light entrance means and light exit means, in which said elongated body comprises a fiber optic cylinder, said light entrance means and said light exit means being defined by flat opposite end surfaces normal to the axis of said cylinder, different angles of the entering light pulses being defined with respect to the axis of said cylinder so that said different lengths of light paths result from internal reflections at different angles in said cylinder, said pulse lasers being positioned to direct their generated output pulses of coherent light into said light entrance means at angles different from each other so that the light paths between said light entrance means and light exit means travelled by the output pulses from the lasers are of different lengths;
    (c) a trigger means for providing a trigger signal for said lasers; and,
    (d) delay line means connected to said trigger means and having tap off points to said pulse lasers so that said trigger signal travels down said delay line means to trigger successively said pulse lasers at predetermined time intervals such that the output pulses from said lasers exit from said light exit means in said body substantially simultaneously.

* * * * *